(12) United States Patent
Sakai et al.

(10) Patent No.: US 10,234,727 B2
(45) Date of Patent: Mar. 19, 2019

(54) MIRROR DISPLAY COMPRISING A HALF MIRROR PLATE INCLUDING A REFLECTIVE POLARIZER AND A POLARIZATION CONVERSION LAYER

(71) Applicant: Sharp Kabushiki Kaisha, Sakai, Osaka (JP)

(72) Inventors: Akira Sakai, Sakai (JP); Hiroyuki Hakoi, Sakai (JP); Masahiro Hasegawa, Sakai (JP); Kiyoshi Minoura, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 14 days.

(21) Appl. No.: 15/522,407

(22) PCT Filed: Oct. 22, 2015

(86) PCT No.: PCT/JP2015/079815
§ 371 (c)(1),
(2) Date: Apr. 27, 2017

(87) PCT Pub. No.: WO2016/068011
PCT Pub. Date: May 6, 2016

(65) Prior Publication Data
US 2017/0329169 A1 Nov. 16, 2017

(30) Foreign Application Priority Data
Oct. 28, 2014 (JP) ................. 2014-219376

(51) Int. Cl.
*G02F 1/1335* (2006.01)
*G02F 1/13363* (2006.01)

(52) U.S. Cl.
CPC .... *G02F 1/13363* (2013.01); *G02F 1/133536* (2013.01); *G02F 2001/133531* (2013.01);
(Continued)

(58) Field of Classification Search
CPC ..... G02F 2413/08; G02F 2001/133531; G02F 2001/133638; G02F 2413/07; G02F 1/133536; G02F 2203/64; G02F 2413/03
See application file for complete search history.

(56) References Cited

U.S. PATENT DOCUMENTS

| 2004/0001169 A1* | 1/2004 | Saiki | G02B 5/3033 |
| | | | 349/96 |
| 2004/0051827 A1* | 3/2004 | Hinata | G02F 1/133528 |
| | | | 349/113 |

(Continued)

FOREIGN PATENT DOCUMENTS

| JP | 2009-122454 A | 6/2009 |
| JP | 4822432 B2 | 11/2011 |

*Primary Examiner* — Paul C Lee
(74) *Attorney, Agent, or Firm* — Keating & Bennett, LLP

(57) ABSTRACT

The present invention provides a mirror display that can be enlarged without quality deterioration. The mirror display includes, in the order from a viewing surface side, a half mirror plate including a reflective polarizer, a polarization conversion layer, and a display device including an absorptive polarizer on a side of the polarization conversion layer. The reflective polarizer includes a transmission axis parallel to the longitudinal direction of the display device and is jointless. The absorptive polarizer includes a transmission axis perpendicular to the longitudinal direction of the display device and is jointless. The polarization conversion layer is configured to convert the polarization of polarized light passed through the absorptive polarizer.

10 Claims, 8 Drawing Sheets

(52) U.S. Cl.
CPC .......... *G02F 2001/133638* (2013.01); *G02F 2203/64* (2013.01); *G02F 2413/03* (2013.01); *G02F 2413/07* (2013.01); *G02F 2413/08* (2013.01)

(56) References Cited

U.S. PATENT DOCUMENTS

| | | | |
|---|---|---|---|
| 2004/0125430 A1* | 7/2004 | Kasajima | G02F 1/133536 359/247 |
| 2005/0200776 A1* | 9/2005 | Hara | G02B 5/3041 349/98 |
| 2006/0238867 A1* | 10/2006 | Takeda | G02B 27/288 359/485.02 |
| 2008/0024700 A1 | 1/2008 | Yoshimi | |
| 2011/0019133 A1* | 1/2011 | Ko | G02F 1/133528 349/96 |
| 2011/0216269 A1* | 9/2011 | Kobayashi | G02F 1/1335 349/62 |
| 2015/0103292 A1* | 4/2015 | Rasmussen | F21V 9/14 349/62 |

\* cited by examiner

MIRROR DISPLAY COMPRISING A HALF MIRROR PLATE INCLUDING A REFLECTIVE POLARIZER AND A POLARIZATION CONVERSION LAYER

TECHNICAL FIELD

The present invention relates to mirror displays. Specifically, the present invention relates to a mirror display that operates both in a mirror mode functioning as a mirror and in a display mode displaying images.

BACKGROUND ART

Mirror displays for digital signage or the like applications have been proposed which include a half mirror plate with a half mirror layer on the viewing surface side of a display device to function as a mirror. Such mirror displays provide images by display light emitted from the display devices and are also used as mirrors by reflecting external light.

For the half mirror layer, an optical member with reflective function is used, and known examples thereof include reflective polarizers such as a multilayer reflective polarizer. A reflective polarizer reflects, among incident light components, polarized light components that are parallel to the reflection axis and transmits polarized light components that are perpendicular to the reflection axis. Thus, a reflective polarizer can transmit light that is emitted from a display device as display light to the viewing surface side and reflect external light that is perpendicular to the polarization direction of the display light to the viewing surface side. Such a mirror display including a reflective polarizer as a half mirror layer switches between a display mode and a mirror mode by the use of such a principle.

Proposed examples of the display device include a liquid crystal display device that can be enlarged (for example, see Patent Literature 1) and a liquid crystal display device that surely achieves the visibility through polarized sunglasses at any screen orientation (for example, see Patent Literature 2).

CITATION LIST

Patent Literature

Patent Literature 1: JP 4822432 B
Patent Literature 2: JP 2009-122454 A

SUMMARY OF INVENTION

Technical Problem

However, when a reflective polarizer is used as a half mirror layer in a display device including an absorptive polarizer on the viewing surface side, enlarging the mirror display is difficult. The reason for this is described below.

Here, a case of forming a rectangular mirror display that includes, in the order from the viewing surface side, a reflective polarizer as a half mirror layer and a display device including an absorptive polarizer on the reflective polarizer side is considered. In order to efficiently utilize display light emitted from the display device to the maximum extent and thereby achieve high luminance display in a display mode, the transmission axis of the absorptive polarizer and the transmission axis of the reflective polarizer are preferably parallel to each other (in a parallel Nicol state). In this case, the transmission axis of the absorptive polarizer and the transmission axis of the reflective polarizer are usually each located perpendicular to the longitudinal direction of the display device. Meanwhile, when a film roll (hereinafter, also referred to as an original film) is produced by an industrially practical method, the transmission axis of the absorptive polarizer is made parallel to the width direction of the original film whereas the transmission axis of the reflective polarizer is made parallel to the machine direction of the original film. Accordingly, the length of the reflective polarizer in the direction of the reflection axis that is perpendicular to the transmission axis, namely, the length of the display device in the longitudinal direction (in the longitudinal direction of the mirror display), is limited within the width of the original film of the reflective polarizer. Furthermore, in a conventional production process, the width of the original film of the reflective polarizer is equal to or shorter than the width of the original film of the absorptive polarizer. Therefore, enlarging a mirror display providing high luminance display in a display mode is difficult.

In order to accomplish enlargement of such a mirror display, the inventors of the present invention studied a method in which the layout of the transmission axis of the absorptive polarizer and the transmission axis of the reflective polarizer remains the same as above and the reflective polarizer is enlarged by jointing some pieces of a reflective polarizer in the longitudinal direction of the display device. The inventors noticed that the joints of the reflective polarizer disposed on the side closer to a viewer in this configuration are unfortunately visible to the viewer to deteriorate the design.

The inventors of the present invention then studied a method in which the transmission axis of the absorptive polarizer and the transmission axis of the reflective polarizer are rotated by 90° so that each transmission axis is parallel to the longitudinal direction of the display device, and the absorptive polarizer is enlarged by jointing some pieces of an absorptive polarizer in the longitudinal direction of the display device. The inventors found that this configuration cannot be achieved with a general display device and thus requires a specially fabricated display device including the above described absorptive polarizer. This is because, for example, the longitudinal direction in a typical liquid crystal display device is designed to be perpendicular to the vertical direction (that is parallel to the horizontal direction), and the transmission axis of the absorptive polarizer on the viewing surface side is designed to be parallel to the vertical direction so that displayed images can be perceived through polarized sunglasses. Accordingly, in a mirror display employing the above special display device, displayed images in a display mode cannot be perceived through polarized sunglasses. In addition, since the absorptive polarizer has substantially no polarizer at the joints, the region corresponding to the joints fails to provide black display, resulting in bright lines.

As described above, no methods have been found for providing a mirror display that can be enlarged without quality deterioration. For example, Patent Literature 1 relates to enlargement of a liquid crystal display device but not to production of an enlarged mirror display. Similarly, Patent Literature 2 does not achieve production of an enlarged mirror display.

The present invention has been made in the current situation in the art, and aims to provide a mirror display that can be enlarged without quality deterioration.

Solution to Problem

Through various studies on a mirror display that can be enlarged without quality deterioration, the inventors focused on the following configuration. That is, a jointless absorptive polarizer and a jointless reflective polarizer are used and the direction of the transmission axis of the reflective polarizer whose length is not limited to the width of the original film corresponds to the longitudinal direction of the display device. Specifically, in the focused configuration, the transmission axis of the absorptive polarizer is perpendicular to the transmission axis of the reflective polarizer. However, this configuration is not enough to allow display light emitted from the display device through the absorptive polarizer to pass through the reflective polarizer. To solve this problem, the inventors found a configuration including a polarization conversion layer that converts the polarization of polarized light passed through the absorptive polarizer between the absorptive polarizer and the reflective polarizer. Founding that this configuration can successfully solve the above problem, the inventors arrived at the present invention.

Specifically, an aspect of the present invention may be a mirror display including, in the order from a viewing surface side, a half mirror plate including a reflective polarizer; a polarization conversion layer; and a display device including an absorptive polarizer on a side of the polarization conversion layer, the reflective polarizer including a transmission axis parallel to the longitudinal direction of the display device and being jointless, the absorptive polarizer including a transmission axis perpendicular to the longitudinal direction of the display device and being jointless, the polarization conversion layer being configured to convert the polarization of polarized light passed through the absorptive polarizer.

Advantageous Effects of Invention

The present invention can provide a mirror display that can be enlarged without quality deterioration.

DESCRIPTION OF EMBODIMENTS

The present invention is described in more detail based on examples with reference to the drawings. The examples, however, are not intended to limit the present invention. Also, the configurations of the respective examples may appropriately be combined or modified within the spirit of the present invention.

Although the following examples describe cases of employing a liquid crystal display device as a display device, any types of display devices that emit polarized light may be used.

A display mode herein means a state in which display light is emitted from a display device (display state) and the display light passes through a half mirror plate. A mirror mode herein means a state in which no display light is emitted from a display device (non-display state).

Example 1

Example 1 relates to a mirror display including a liquid crystal display device, a λ/2 plate as a polarization conversion layer, and a reflective polarizer as a half mirror layer.

Figure 1:
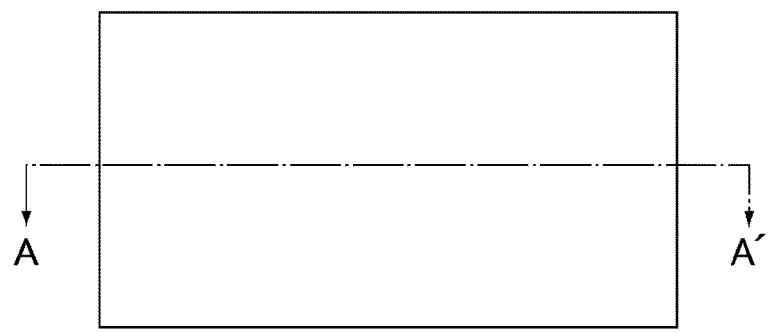
FIG. 1 is a schematic plan view of a mirror display of each of Examples 1 to 7.

FIG. 1 is a schematic plan view of a mirror display of Example 1. The following describes a case in which the mirror display has a rectangular planar shape as shown in FIG. 1. The longitudinal direction of the mirror display corresponds to the lateral direction in FIG. 1. In the following, the azimuth that is parallel to the longitudinal direction of the mirror display is defined as 0°. The same shall apply to the other figures.

Figure 2:
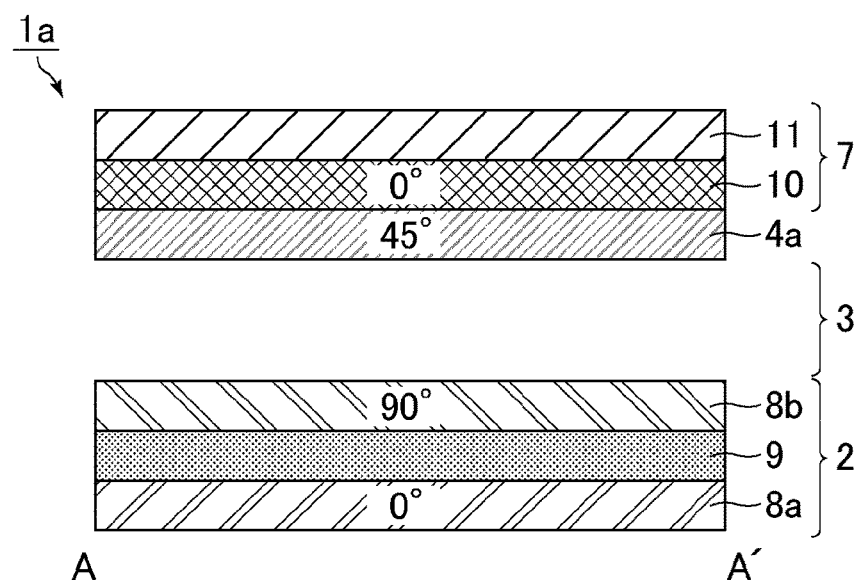
FIG. 2 is a schematic cross-sectional view of a cross section taken along the line A-A' in FIG. 1 (Example 1).

FIG. 2 is a schematic cross-sectional view of a cross section taken along the line A-A' in FIG. 1 (Example 1). As shown in FIG. 2, a mirror display 1a includes, in the order from the back surface side to the viewing surface side, a liquid crystal display device 2, an air layer 3, a λ/2 plate 4a, and a half mirror plate 7. The λ/2 plate 4a was attached to and integrated with the half mirror plate 7 with an acrylic pressure-sensitive adhesive (not shown). The liquid crystal display device 2 and the integrated member including the λ/2 plate 4a and the half mirror plate 7 were fixed by fitting the upper and lower edges of the integrated member to a pair of aluminum rails which were attached to the upper and lower edges of the liquid crystal display device 2 so as to form a frame-like structure. The air layer 3 is a space formed in a slight gap between the liquid crystal display device 2 and the λ/2 plate 4a. Each angle shown in FIG. 2 shows the azimuth of the transmission axis of the absorptive polarizer or reflective polarizer, or the azimuth of the slow axis of the retarder. The "viewing surface side" herein means the upper side of the mirror display 1a in FIG. 2. The "back surface side" herein means the lower side of the mirror display 1a in FIG. 2. The longitudinal direction of the liquid crystal display device 2 is the same as the longitudinal direction of the mirror display 1a. The same shall apply to the other figures.

The liquid crystal display device 2 includes, in the order from the back surface side to the viewing surface side, an absorptive polarizer 8a, a liquid crystal display panel 9, and an absorptive polarizer 8b. The display mode of the liquid crystal display panel 9 was UV2A. The liquid crystal display device 2 may appropriately include a bezel or the like in the frame region. The bezel is preferably made of a black plastic resin.

The absorptive polarizer 8a was attached to the back surface side of the liquid crystal display panel 9 with an acrylic pressure-sensitive adhesive (not shown). The absorptive polarizer 8b was attached to the viewing surface side of the liquid crystal display panel 9 with an acrylic pressure-sensitive adhesive (not shown). The absorptive polarizer 8a and the absorptive polarizer 8b were placed in a crossed Nicol state, namely, the transmission axis of the absorptive polarizer 8a was at an azimuth of 0° and the transmission axis of the absorptive polarizer 8b was at an azimuth of 90°, provided that the degree of azimuth is defined to be positive (+) in the counterclockwise direction starting from the longitudinal direction (long side) of the liquid crystal display device 2. The azimuths of the axes are described on the basis of the above definition hereinbelow. According to a conventional production process, the width of the original film of the absorptive polarizer 8a and the absorptive polarizer 8b is larger than the width of the original film of a reflective polarizer 10. Accordingly, the absorptive polarizer 8a and the absorptive polarizer 8b were able to be formed larger than the reflective polarizer 10 without joints. In other words, the absorptive polarizer 8a and the absorptive polarizer 8b were each obtained not by jointing multiple pieces of an absorptive polarizer but by cutting out one film from the original film. The absorptive polarizer 8b underwent no anti-reflection treatment but underwent an anti-glare (AG) treatment with a haze of 3.0% on the surface thereof.

The half mirror plate 7 includes, in the order from the back surface side to the viewing surface side, the reflective polarizer 10 as a half mirror layer and a glass substrate 11 as a base material. The members were attached to each other with an acrylic pressure-sensitive adhesive (not shown).

The thickness of the glass substrate 11 was 3 mm. The thickness of the glass substrate is not limited to 3 mm and may be larger or smaller than 3 mm. The glass substrate 11 is suitably made of tempered glass. The glass substrate 11 as a base material may be replaced with a transparent plate made of acrylic resin, for example. In terms of better flatness and rigidity of the half mirror plate 7, a glass substrate is preferably used for the base material.

The reflective polarizer 10 used was a multilayer reflective polarizer (trade name: DBEF) available from Sumitomo 3M Ltd. and was placed such that the transmission axis was at an azimuth of 0°. In this arrangement, the direction of the transmission axis of the reflective polarizer 10 is parallel to the longitudinal direction of the mirror display 1a (liquid crystal display device 2). When an original film of the reflective polarizer 10 is produced, the transmission axis is formed in the machine direction of the original film. Thus, the length of the reflective polarizer 10 has no limit in the transmission axis direction. Accordingly, the length of the mirror display 1a in the longitudinal direction was able to be made longer than the width of the original film of the reflective polarizer 10 without joints. In other words, the reflective polarizer 10 was obtained not by jointing multiple pieces of a reflective polarizer but by cutting out one film from the original film.

As described above, the mirror display of Example 1 includes the reflective polarizer 10 whose transmission axis is parallel to the longitudinal direction of the liquid crystal display device 2 and the absorptive polarizer 8b whose transmission axis is perpendicular to the longitudinal direction of the liquid crystal display device 2. In other words, the transmission axis of the reflective polarizer 10 and the transmission axis of the absorptive polarizer 8b are perpendicular to each other. The expression two directions are parallel to each other herein means that the angle formed by the two directions is within 0°±3°, preferably 0°±1°, more preferably 0°±0.5°. The expression two directions are perpendicular to each other herein means that the angle formed by the two directions is within 90°±3°, preferably 90°±1°, more preferably 90°±0.5°.

The λ/2 plate 4a used was a liquid crystal film (coating-type retarder) and was placed such that the slow axis was at an azimuth of 45°. The coating-type retarder was formed by the following method. First, a saponified triacetylcellulose (TAC) film including a polyvinylalcohol alignment film (thickness: 1 μm) on the surface was prepared as a base film. The base film underwent rubbing treatment in an oblique direction at an angle of 45° from the machine direction using a rayon raised fabric-wrapped rubbing roll. Next, to the rubbed base film was applied a coating solution including a liquid crystalline material prepared by adding a photopolymerization initiator to a polymerizable liquid crystal compound with a nematic liquid crystal phase and dissolving the resultant product in toluene. Finally, a homogeneous alignment formed in a liquid crystal state was fixed by a photo curing reaction under light irradiation with a metal halide lamp at a dose of 20 mJ/cm2. The λ/2 plate 4a was jointless. Such a coating-type retarder, having undergone alignment treatment in an oblique direction from the machine direction of the original film, can be attached to the reflective polarizer 10 by a roll-to-roll attachment process, thereby reducing the production cost. The roll-to-roll attachment process can also be employed for attachment of the absorptive polarizer 8b to the λ/2 plate 4a if necessary because the machine directions of the respective original films are parallel to each other. In conclusion, the absorptive polarizer 8b, the λ/2 plate 4a, and the reflective polarizer 10 can be attached together by the roll-to-roll attachment process. The coating-type retarder may be formed by a method in which no particular alignment treatment is performed on the base film, a method in which, after alignment fixation, the cured liquid crystalline material is peeled off the base film to be transferred to another film, or a method including application of a birefringent material other than the liquid crystalline material. A coating-type retarder formed by any of these methods can be attached to the reflective polarizer 10 by the roll-to-roll attachment process by performing alignment treatment on the original film in an oblique direction from the machine direction, thereby reducing the production cost. The λ/2 plate 4a may be one to which stretch alignment is performed in an oblique direction at an angle of 45° from the machine direction of the original film. The λ/2 plate 4a formed by this method can also be attached to the reflective polarizer 10 by the roll-to-roll attachment process, thereby reducing the production cost. When the λ/2 plate 4a is formed by stretch alignment, any stretching method may be employed as long as the resulting λ/2 plate 4a causes a desired phase difference. The transmission axis of the reflective polarizer 10 is parallel to the machine direction of the original film. In order to attach the reflective polarizer 10 to the λ/2 plate 4a whose slow axis has a relative angle not parallel to the transmission axis of the reflective polarizer 10 by the roll-to-roll attachment process, an oblique stretching process is preferably employed which performs stretch alignment in an oblique direction from the machine direction of the original film.

The mirror display of Example 1 can operate both in the display mode and in the mirror mode by the following principles.

In the display mode, the liquid crystal display panel 9 displays an image, and a viewer sees the image on the liquid crystal display panel 9 through the half mirror plate 7. Light emitted from the liquid crystal display device 2 through the absorptive polarizer 8*b* is linearly polarized light vibrating at an azimuth of 90°. The light passes through the λ/2 plate 4*a* which rotates the polarization azimuth of the light. Once linearly polarized light at a relative azimuth (an angle formed by the slow axis of the λ/2 plate 4*a* and the vibrating direction of the linearly polarized light) of Φ passes through the λ/2 plate 4*a*, the light is converted into linearly polarized light at a relative azimuth of −Φ. Thus, light passed through the λ/2 plate 4*a* having a slow axis at an azimuth of 45° is converted into linearly polarized light vibrating at an azimuth of 0°. The light passed through the λ/2 plate 4*a* can then pass through the reflective polarizer 10 whose transmission axis is at an azimuth of 0° with little loss. The mirror display of Example 1 can thus provide high luminance display.

In the mirror mode, the liquid crystal display panel 9 displays no image, and a viewer sees only external light reflected by the half mirror plate 7. Among the light components incident on the half mirror plate 7 from the viewing surface side, almost all of the linearly polarized light components vibrating at an azimuth of 90° are reflected by the reflective polarizer 10 whose transmission axis is at an azimuth of 0°, namely, whose reflection axis is at an azimuth of 90°.

In contrast, among the light components incident on the half mirror plate 7 from the viewing surface side, linearly polarized light components vibrating at an azimuth of 0° pass through the reflective polarizer 10 whose transmission axis is at an azimuth of 0°. The vibration azimuth of the light components passed through the reflective polarizer 10 is rotated by the λ/2 plate 4*a* which converts the light components into linearly polarized light components vibrating at an azimuth of 90°. The light components passed through the λ/2 plate 4*a* then pass through the absorptive polarizer 8*b* whose transmission axis is at an azimuth of 90° and the liquid crystal display panel 9 in the stated order, and are finally absorbed by the absorptive polarizer 8*a* whose transmission axis is at an azimuth of 0°, namely, whose absorption axis is at an azimuth of 90°.

The mirror display of Example 1 includes the reflective polarizer 10 whose length in the direction of the transmission axis is not limited to the width of the original film and whose transmission axis corresponds to the longitudinal direction of the display device, and thus can be enlarged. The feasible size of the mirror display will be described in the evaluation results below.

Although the mirror display of Example 1 employed a configuration in which the λ/2 plate 4*a* was attached to and integrated with the reflective polarizer 10 side of the half mirror plate 7, the mirror display may also employ a configuration in which the λ/2 plate 4*a* is attached to and integrated with the absorptive polarizer 8*b* side of the liquid crystal display device 2. Alternatively, a configuration in which the liquid crystal display device 2, the λ/2 plate 4*a*, and the reflective polarizer 10 (half mirror plate 7) are attached and integrated together with a pressure-sensitive adhesive or adhesive, namely, a configuration without the air layer 3 may be employed. Although a λ/2 plate was employed for the polarization conversion layer, any polarization conversion layer that converts the polarization of the polarized light passed through the absorptive polarizer 8*b* may be employed, such as a different retarder, a polarization rotator, or a polarizer. In terms of efficient use of the polarized light passed through the absorptive polarizer 8*b* for high luminance display in the display mode, the polarization conversion layer is particularly preferably one that rotates the azimuth of the polarized light passed through the absorptive polarizer 8*b* by 90°. Using such a polarization conversion layer with the absorptive polarizer 8*b* and the reflective polarizer 10 whose absorption axes are perpendicular to each other can provide a pseudo parallel Nicol state. Alternatively, the polarization conversion layer may be one that converts the polarized light into elliptically polarized light or one that rotates the polarized light by an angle other than 90°. Such polarization conversion layers can also achieve the display mode because they allow at least part of the polarized light passed through the polarization conversion layer to pass through the reflective polarizer 10. The polarization conversion layer may consist of a single layer or of multiple layers.

Although the mirror display of Example 1 had a rectangular planar shape, it may have a square planar shape, for example. In this case, the longitudinal direction may be along any sides of the square.

Example 2

Example 2 describes the case in which two λ/4 plates are used as polarization conversion layers and these λ/4 plates are stacked and integrated with a half mirror plate. Since the mirror display of Example 2 is the same as the mirror display of Example 1 except for the above configuration, the description of the same respects is omitted here.

Figure 3:
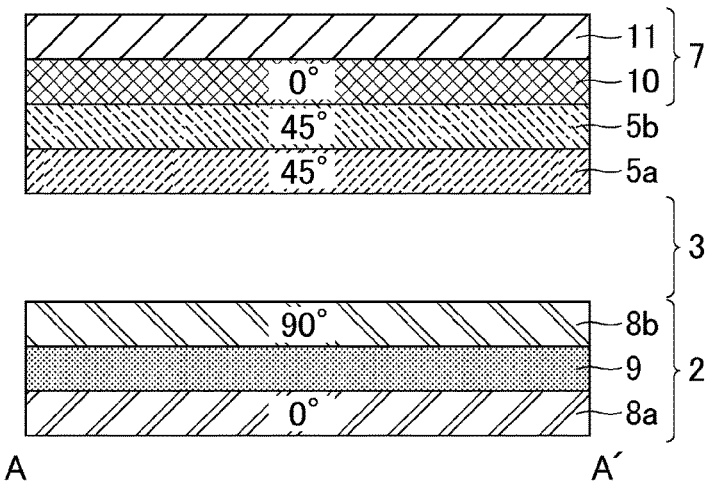
FIG. 3 is a schematic cross-sectional view of a cross section taken along the line A-A' in FIG. 1 (Example 2).

A schematic plan view of a mirror display of Example 2 is the same as in FIG. 1. FIG. 3 is a schematic cross-sectional view of a cross section taken along the line A-A' in FIG. 1 (Example 2). As shown in FIG. 3, a mirror display 1*b* includes, in the order from the back surface side to the viewing surface side, the liquid crystal display device 2, the air layer 3, a λ/4 plate 5*a*, a λ/4 plate 5*b*, and the half mirror plate 7. The λ/4 plate 5*a* and the λ/4 plate 5*b* were stacked with an acrylic pressure-sensitive adhesive (not shown). The laminate of the λ/4 plate 5*a* and the λ/4 plate 5*b* were attached to and integrated with the half mirror plate 7 with an acrylic pressure-sensitive adhesive (not shown). The liquid crystal display device 2 and the integrated member including the λ/4 plate 5*a*, the λ/4 plate 5*b*, and the half mirror plate 7 were fixed by fitting the upper and lower edges of the integrated member to a pair of aluminum rails which were attached to the upper and lower edges of the liquid crystal display device 2 so as to form a frame-like structure. The air layer 3 is a space formed in a slight gap between the liquid crystal display device 2 and the λ/4 plate 5*a*.

The λ/4 plate 5*a* and the λ/4 plate 5*b* used were λ/4 plates (trade name: ZD film, available from Zeon Corporation) which underwent stretch alignment in an oblique direction at an angle of 45° from the machine direction of the original film by an oblique stretching process. Each plate was placed such that the slow axis was at an azimuth of 45°. The λ/4 plate 5*a* and the λ/4 plate 5*b* were jointless. The λ/4 plate 5*a* and the λ/4 plate 5*b* are preferably ones which underwent stretch alignment in an oblique direction at an angle of 45° from the machine direction of the original film. This configuration enables the λ/4 plate 5*a*, the λ/4 plate 5*b*, and the reflective polarizer 10 to be attached together by the roll-to-roll attachment process, thereby reducing the production cost. The λ/4 plate 5a and the λ/4 plate 5b may be stretched by any method as long as the resulting λ/4 plate 5a and the λ/4 plate 5b each cause a desired phase difference. The transmission axis of the reflective polarizer 10 is parallel to the machine direction of the original film. In order to attach the λ/4 plate 5a and λ/4 plate 5b, whose slow axes each have a relative angle not parallel to the transmission axis of the reflective polarizer 10, to the reflective polarizer 10 by the roll-to-roll attachment process, an oblique stretching process is preferably employed which performs stretch alignment in an oblique direction from the machine direction of the original film. Instead of stretching a polymer film, a coating-type retarder in which a liquid crystalline material is applied to a base film that underwent alignment treatment may be used. Alternatively, a coating-type retarder may be used which is formed by a method of performing alignment fixation, a method in which no particular alignment treatment is performed on the base film, a method in which, after alignment fixation, the cured liquid crystalline material is peeled off the base film to be transferred to another film, or a method including application of a birefringent material other than the liquid crystalline material. A coating-type retarder formed by any of these methods can be attached to the multilayer reflective polarizer by the roll-to-roll attachment process by performing alignment treatment on the original film in an oblique direction from the machine direction, thereby reducing the production cost.

The mirror display of Example 2 can operate both in the display mode and in the mirror mode by the following principle.

In the display mode, the liquid crystal display panel 9 displays an image, and a viewer sees the image on the liquid crystal display panel 9 through the half mirror plate 7. Light emitted from the liquid crystal display device 2 through the absorptive polarizer 8b is linearly polarized light vibrating at an azimuth of 90°. The light passes through the λ/4 plate 5a and is then converted into circularly polarized light. The light passed through the λ/4 plate 5a then passes through the λ/4 plate 5b and is converted into linearly polarized light vibrating at an azimuth of 0°. Subsequently, the light passed through the λ/4 plate 5b can pass through the reflective polarizer 10 whose transmission axis is at an azimuth of 0° with little loss. The mirror display of Example 2 can thus provide high luminance display.

In the mirror mode, the liquid crystal display panel 9 displays no image, and a viewer sees only external light reflected by the half mirror plate 7. Among the light components incident on the half mirror plate 7 from the viewing surface side, almost all of the linearly polarized light components vibrating at an azimuth of 90° are reflected by the reflective polarizer 10 whose transmission axis is at an azimuth of 0°, namely, whose reflection axis is at an azimuth of 90°.

In contrast, among the light components incident on the half mirror plate 7 from the viewing surface side, linearly polarized light components vibrating at an azimuth of 0° pass through the reflective polarizer 10 whose transmission axis is at an azimuth of 0°. The light components passed through the reflective polarizer 10 then pass through the λ/4 plate 5b and are thereby converted into circularly polarized light components. The light components passed through the λ/4 plate 5b then pass through the λ/4 plate 5a and are thereby converted into linearly polarized light components vibrating at an azimuth of 90°. Subsequently, the light components passed through the λ/4 plate 5a pass through the absorptive polarizer 8b whose transmission axis is at an azimuth of 90° and the liquid crystal display panel 9 in the stated order, and are finally absorbed by the absorptive polarizer 8a whose transmission axis is at an azimuth of 0°, namely, whose absorption axis is at an azimuth of 90°.

The mirror display of Example 2 includes the reflective polarizer 10 whose length in the direction of the transmission axis is not limited to the width of the original film and whose transmission axis corresponds to the longitudinal direction of the display device, and thus can be enlarged.

Example 3

Example 3 describes the case in which two λ/4 plates are used as polarization conversion layers and these λ/4 plates are stacked and integrated with a liquid crystal display device. Since the mirror display of Example 3 is the same as the mirror display of Example 2 except for the above configuration, the description of the same respects is omitted here.

Figure 4:
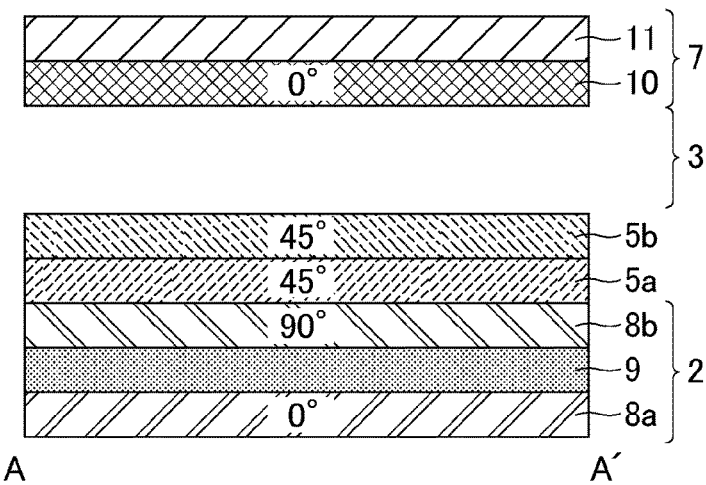
FIG. 4 is a schematic cross-sectional view of a cross section taken along the line A-A' in FIG. 1 (Example 3).

A schematic plan view of a mirror display of Example 3 is the same as in FIG. 1. FIG. 4 is a schematic cross-sectional view of a cross section taken along the line A-A' in FIG. 1 (Example 3). As shown in FIG. 4, a mirror display 1c includes, in the order from the back surface side to the viewing surface side, the liquid crystal display device 2, the λ/4 plate 5a, the λ/4 plate 5b, the air layer 3, and the half mirror plate 7. The λ/4 plate 5a and the λ/4 plate 5b were stacked with an acrylic pressure-sensitive adhesive (not shown). The laminate of the λ/4 plate 5a and the λ/4 plate 5b was attached to and integrated with the liquid crystal display device 2 with an acrylic pressure-sensitive adhesive (not shown). The integrated member including the liquid crystal display device 2, the λ/4 plate 5a, and the λ/4 plate 5b and the half mirror plate 7 were fixed by fitting the upper and lower edges of the half mirror plate 7 to a pair of aluminum rails which were attached to the upper and lower edges of the integrated member so as to form a frame-like structure. The air layer 3 is a space formed in a slight gap between the λ/4 plate 5b and the half mirror plate 7.

Since the operating principles in the display mode and mirror mode of the mirror display of Example 3 are the same as those of the mirror display of Example 2 except for the positions of the polarization conversion layers (the λ/4 plate 5a and the λ/4 plate 5b), the description thereof is omitted here.

The mirror display of Example 3 includes the reflective polarizer 10 whose length in the direction of the transmission axis is not limited to the width of the original film and whose transmission axis corresponds to the longitudinal direction of the display device, and thus can be enlarged.

Example 4

Example 4 describes the case in which two λ/4 plates are used as polarization conversion layers, one of the λ/4 plates is integrated with a liquid crystal display device, and the other is integrated with a half mirror plate. Since the mirror display of Example 4 is the same as the mirror display of Example 2 except for the above configuration, the description of the same respects is omitted here.

Figure 5:
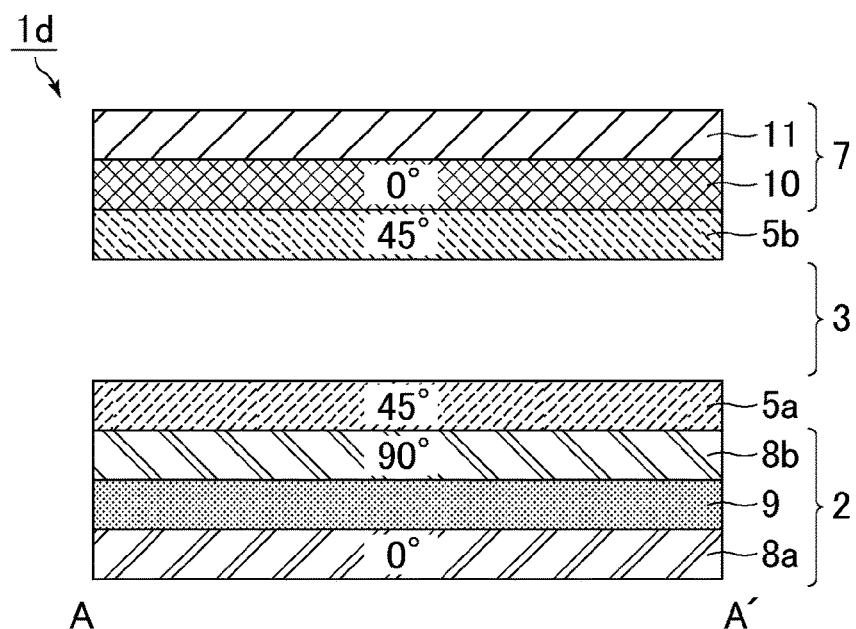
FIG. 5 is a schematic cross-sectional view of a cross section taken along the line A-A' in FIG. 1 (Example 4).

A schematic plan view of a mirror display of Example 4 is the same as in FIG. 1. FIG. 5 is a schematic cross-sectional view of a cross section taken along the line A-A' in FIG. 1 (Example 4). As shown in FIG. 5, a mirror display 1d includes, in the order from the back surface side to the viewing surface side, the liquid crystal display device 2, the λ/4 plate 5a, the air layer 3, the λ/4 plate 5b, and the half mirror plate 7. The λ/4 plate 5a was attached to and integrated with the liquid crystal display device 2 with an acrylic pressure-sensitive adhesive (not shown). The λ/4 plate 5b was attached to and integrated with the half mirror plate 7 with an acrylic pressure-sensitive adhesive (not shown). The integrated member including the liquid crystal display device 2 and the λ/4 plate 5a and the integrated member including the λ/4 plate 5b and the half mirror plate 7 were fixed by fitting the upper and lower edges of the integrated member including the λ/4 plate 5b and the half mirror plate 7 to a pair of aluminum rails which were attached to the upper and lower edges of the integrated member including the liquid crystal display device 2 and the λ/4 plate 5a so as to form a frame-like structure. The air layer 3 is a space formed in a slight gap between the λ/4 plate 5a and the λ/4 plate 5b.

Since the operating principles in the display mode and mirror mode of the mirror display of Example 4 are the same as those of the mirror display of Example 2 except for the positions of the polarization conversion layers (the λ/4 plate 5a and the λ/4 plate 5b), the description thereof is omitted here.

The mirror display of Example 4 includes the reflective polarizer 10 whose length in the direction of the transmission axis is not limited to the width of the original film and whose transmission axis corresponds to the longitudinal direction of the display device, and thus can be enlarged.

In the mirror display of Example 4, as shown in FIG. 5, the absorptive polarizer 8b and the λ/4 plate 5a are stacked, and the λ/4 plate 5b and the reflective polarizer 10 are stacked. In this case, the laminate including the absorptive polarizer 8b and the λ/4 plate 5a and the laminate including the λ/4 plate 5b and the reflective polarizer 10 each constitute a circularly polarizing plate. Such a configuration eliminates the need for angle alignment between the integrated member including the liquid crystal display device 2 and the λ/4 plate 5a and the integrated member including λ/4 plate 5b and the half mirror plate 7. The laminate including the absorptive polarizer 8b and the λ/4 plate 5a may be, for example, one disclosed in Patent Literature 2.

Example 5

Example 5 describes the case in which a polarization rotator is used as a polarization conversion layer. Since the mirror display of Example 5 is the same as the mirror display of Example 1 except for the above configuration, the description of the same respects is omitted here.

Figure 6:
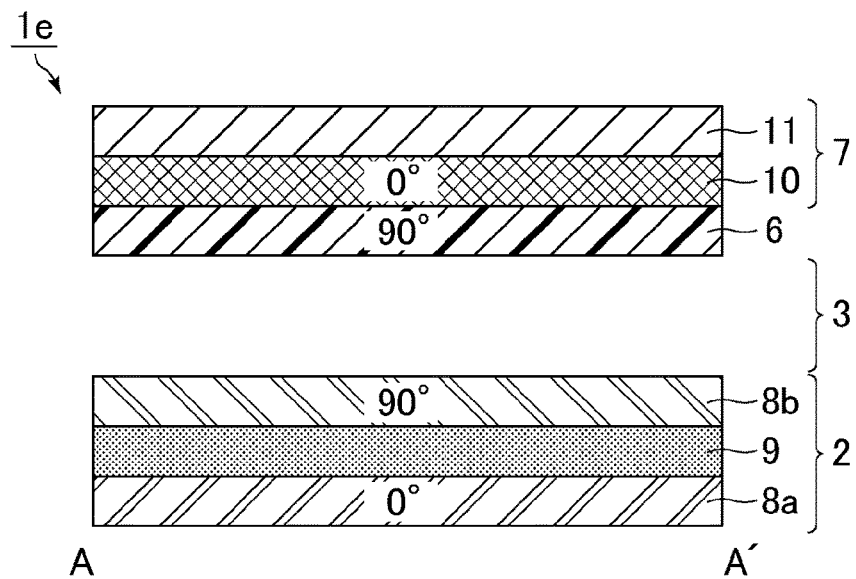
FIG. 6 is a schematic cross-sectional view of a cross section taken along the line A-A' in FIG. 1 (Example 5).

A schematic plan view of a mirror display of Example 5 is the same as in FIG. 1. FIG. 6 is a schematic cross-sectional view of a cross section taken along the line A-A' in FIG. 1 (Example 5). As shown in FIG. 6, a mirror display 1e includes, in the order from the back surface side to the viewing surface side, the liquid crystal display device 2, the air layer 3, a polarization rotator 6, and the half mirror plate 7. The polarization rotator 6 was attached to and integrated with the half mirror plate 7 with an acrylic pressure-sensitive adhesive (not shown). The liquid crystal display device 2 and the integrated member including the polarization rotator 6 and the half mirror plate 7 were fixed by fitting the upper and lower edges of the integrated member to a pair of aluminum rails which were attached to the upper and lower edges of the liquid crystal display device 2 so as to form a frame-like structure. The air layer 3 is a space formed in a slight gap between the liquid crystal display device 2 and the polarization rotator 6.

The polarization rotator 6 used was a liquid crystal film and was designed to give an angle of rotation (angle indicated in FIG. 6) of 90° to incident linearly polarized light. The liquid crystal film was formed by the following method. First, a saponified TAC film including a polyvinylalcohol alignment film (thickness: 1 μm) on the surface was prepared as a base film. The base film underwent rubbing treatment in the direction parallel to the machine direction using a rayon raised fabric-wrapped rubbing roll. Next, to the rubbed base film was applied a coating solution prepared by adding a chiral agent to a liquid crystalline material which was prepared by adding a photopolymerization initiator to a polymerizable liquid crystal compound with a nematic liquid crystal phase and dissolving the resultant product in toluene. Finally, a 90° twisted alignment formed in a liquid crystal state was fixed by a photo curing reaction under light irradiation with a metal halide lamp at a dose of 20 mJ/cm2. The polarization rotator 6 was jointless.

The mirror display of Example 5 can operate both in the display mode and in the mirror mode by the following principles.

In the display mode, the liquid crystal display panel 9 displays an image, and a viewer sees the image on the liquid crystal display panel 9 through the half mirror plate 7. Light emitted from the liquid crystal display device 2 through the absorptive polarizer 8b is linearly polarized light vibrating at an azimuth of 90°. The light passes through the polarization rotator 6 which rotates the polarization azimuth of the light by 90° to convert the light into linearly polarized light vibrating at an azimuth of 0°. The light passed through the polarization rotator 6 can then pass through the reflective polarizer 10 whose transmission axis is at an azimuth of 0° with little loss. The mirror display of Example 5 can thus provide high luminance display.

In the mirror mode, the liquid crystal display panel 9 displays no image, and a viewer sees only external light reflected by the half mirror plate 7. Among the light components incident on the half mirror plate 7 from the viewing surface side, almost all of the linearly polarized light components vibrating at an azimuth of 90° are reflected by the reflective polarizer 10 whose transmission axis is at an azimuth of 0°, namely, whose reflection axis is at an azimuth of 90°.

In contrast, among the light components incident on the half mirror plate 7 from the viewing surface side, linearly polarized light components vibrating at an azimuth of 0° pass through the reflective polarizer 10 whose transmission axis is at an azimuth of 0°. The light components passed through the reflective polarizer 10 then pass through the polarization rotator 6 which rotates the polarization azimuth of the light components by 90° to convert the light components into linearly polarized light components vibrating at an azimuth of 90°. The light components passed through the polarization rotator 6 then pass through the absorptive polarizer 8b whose transmission axis is at an azimuth of 90° and the liquid crystal display panel 9 in the stated order, and are finally absorbed by the absorptive polarizer 8a whose transmission axis is at an azimuth of 0°, namely, whose absorption axis is at an azimuth of 90°.

The mirror display of Example 5 includes the reflective polarizer 10 whose length in the direction of the transmission axis is not limited to the width of the original film and whose transmission axis corresponds to the longitudinal direction of the display device, and thus can be enlarged.

Although the mirror display of Example 5 employed a configuration in which the polarization rotator 6 is attached to and integrated with the reflective polarizer 10 side of the half mirror plate 7, a configuration in which the polarization rotator 6 is attached to and integrated with the absorptive polarizer 8b side of the liquid crystal display device 2 may be employed.

Example 6

Example 6 describes the case in which two λ/2 plates are used as polarization conversion layers and these λ/2 plates are stacked and integrated with a half mirror plate. Since the mirror display of Example 6 is the same as the mirror display of Example 1 except for the above configuration, the description of the same respects is omitted here.

Figure 7:
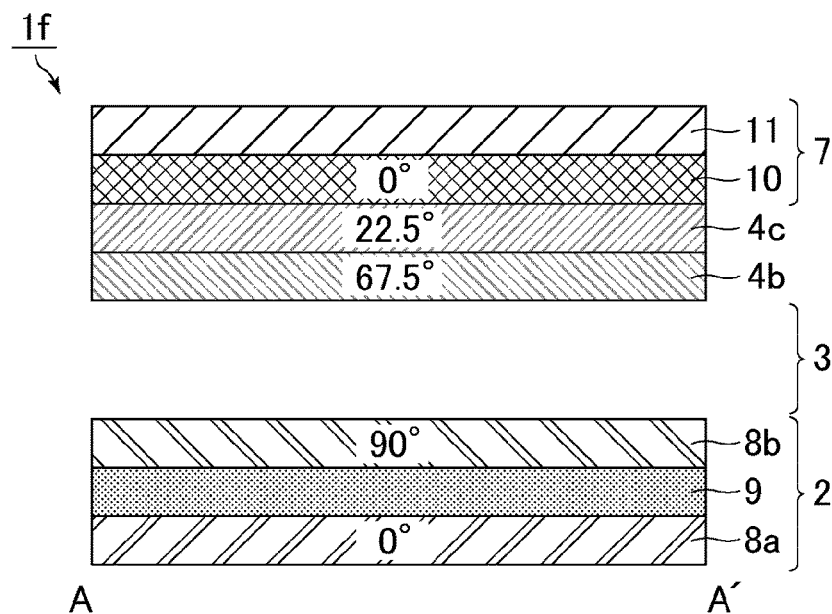
FIG. 7 is a schematic cross-sectional view of a cross section taken along the line A-A' in FIG. 1 (Example 6).

A schematic plan view of a mirror display of Example 6 is the same as in FIG. 1. FIG. 7 is a schematic cross-sectional view of a cross section taken along the line A-A' in FIG. 1 (Example 6). As shown in FIG. 7, a mirror display 1f includes, in the order from the back surface side to the viewing surface side, the liquid crystal display device 2, the air layer 3, a λ/2 plate 4b, a λ/2 plate 4c, and the half mirror plate 7. The λ/2 plate 4b and the λ/2 plate 4c were stacked with an acrylic pressure-sensitive adhesive (not shown). The laminate of the λ/2 plate 4b and the λ/2 plate 4c was attached to and integrated with the half mirror plate 7 with an acrylic pressure-sensitive adhesive (not shown). The liquid crystal display device 2 and the integrated member including the λ/2 plate 4b, the λ/2 plate 4c, and the half mirror plate 7 were fixed by fitting the upper and lower edges of the integrated member to a pair of aluminum rails which were attached to the upper and lower edges of the liquid crystal display device 2 so as to form a frame-like structure. The air layer 3 is a space formed in a slight gap between the liquid crystal display device 2 and the λ/2 plate 4b.

The λ/2 plate 4b used was a liquid crystal film (coating-type retarder) and was placed such that the azimuth of the slow axis was 67.5°. The coating-type retarder was formed by the following method. First, a saponified TAC film including a polyvinylalcohol alignment film (thickness: 1 μm) on the surface was prepared as a base film. The base film underwent rubbing treatment in an oblique direction at an angle of 67.5° from the machine direction using a rayon raised fabric-wrapped rubbing roll. Next, to the rubbed base film was applied a coating solution including a liquid crystalline material prepared by adding a photopolymerization initiator to a polymerizable liquid crystal compound with a nematic liquid crystal phase and dissolving the resultant product in toluene. Finally, a homogeneous alignment formed in a liquid crystal state was fixed by a photo curing reaction under light irradiation with a metal halide lamp at a dose of 20 mJ/cm2. The λ/2 plate 4c used was a liquid crystal film (coating-type retarder) and was placed such that the azimuth of the slow axis was 22.5°. The coating-type retarder was formed by the following method. First, a saponified TAC film including a polyvinylalcohol alignment film (thickness: 1 μm) on the surface was prepared as a base film. The base film underwent rubbing treatment in an oblique direction at an angle of 22.5° from the machine direction using a rayon raised fabric-wrapped rubbing roll. Next, to the rubbed base film was applied a coating solution including a liquid crystalline material prepared by adding a photopolymerization initiator to a polymerizable liquid crystal compound with a nematic liquid crystal phase and dissolving the resultant product in toluene. Finally, a homogeneous alignment formed in a liquid crystal state was fixed by a photo curing reaction under light irradiation with a metal halide lamp at a dose of 20 mJ/cm2. The λ/2 plate 4b and the λ/2 plate 4c were jointless.

The mirror display of Example 6 can operate both in the display mode and in the mirror mode by the following principles.

In the display mode, the liquid crystal display panel 9 displays an image, and a viewer sees the image on the liquid crystal display panel 9 through the half mirror plate 7. Light emitted from the liquid crystal display device 2 through the absorptive polarizer 8b is linearly polarized light vibrating at an azimuth of 90°. The light passes through the λ/2 plate 4b whose slow axis is at an azimuth of 67.5° and is thereby converted into linearly polarized light vibrating at an azimuth of 45°. The light passed through the λ/2 plate 4b then passes through the λ/2 plate 4c whose slow axis is at an azimuth of 22.5° and is thereby converted into linearly polarized light vibrating at an azimuth of 0°. Subsequently, the light passed through the λ/2 plate 4c can pass through the reflective polarizer 10 whose transmission axis is at an azimuth of 0° with little loss. The mirror display of Example 6 can thus provide high luminance display. In addition, as shown in FIG. 7, a configuration including both of the λ/2 plate 4b and the λ/2 plate 4c can eliminate the influence of the wavelength dispersion caused by the λ/2 plates to avoid coloring of the transmitted light.

In the mirror mode, the liquid crystal display panel 9 displays no image, and a viewer sees only external light reflected by the half mirror plate 7. Among the light components incident on the half mirror plate 7 from the viewing surface side, almost all of the linearly polarized light components vibrating at an azimuth of 90° are reflected by the reflective polarizer 10 whose transmission axis is at an azimuth of 0°, namely, whose reflection axis is at an azimuth of 90°.

In contrast, among the light components incident on the half mirror plate 7 from the viewing surface side, linearly polarized light components vibrating at an azimuth of 0° pass through the reflective polarizer 10 whose transmission axis is at an azimuth of 0°. The vibration azimuth of the light components passed through the reflective polarizer 10 is rotated by the λ/2 plate 4c whose slow axis is at an azimuth of 22.5°, and the light components are thereby converted into linearly polarized light vibrating at an azimuth of 45°. The light components passed through the λ/2 plate 4c then pass through the λ/2 plate 4b whose slow axis is at an azimuth of 67.5° and are thereby converted into linearly polarized light vibrating at an azimuth of 90°. Subsequently, the light components passed through the λ/2 plate 4b pass through the absorptive polarizer 8b whose transmission axis is at an azimuth of 90° and the liquid crystal display panel 9 in the stated order, and are finally absorbed by the absorptive polarizer 8a whose transmission axis is at an azimuth of 0°, namely, whose absorption axis is at an azimuth of 90°.

The mirror display of Example 6 includes the reflective polarizer 10 whose length in the direction of the transmission axis is not limited to the width of the original film and whose transmission axis corresponds to the longitudinal direction of the display device, and thus can be enlarged.

Although the mirror display of Example 6 employed a configuration in which the λ/2 plate 4c and the λ/2 plate 4b are attached to and integrated with the reflective polarizer 10 side of the half mirror plate 7 in the stated order, a configuration in which the λ/2 plate 4b and the λ/2 plate 4c are attached to and integrated with the absorptive polarizer 8b side of the liquid crystal display device 2 in the stated order may also be employed.

Example 7

Example 7 describes the case in which two λ/2 plates are used as polarization conversion layers, and one of these λ/2 plates is integrated with a liquid crystal display and the other is integrated with a half mirror plate. Since the mirror display of Example 7 is the same as the mirror display of Example 6 except for the above configuration, the description of the same respects is omitted here.

Figure 8:
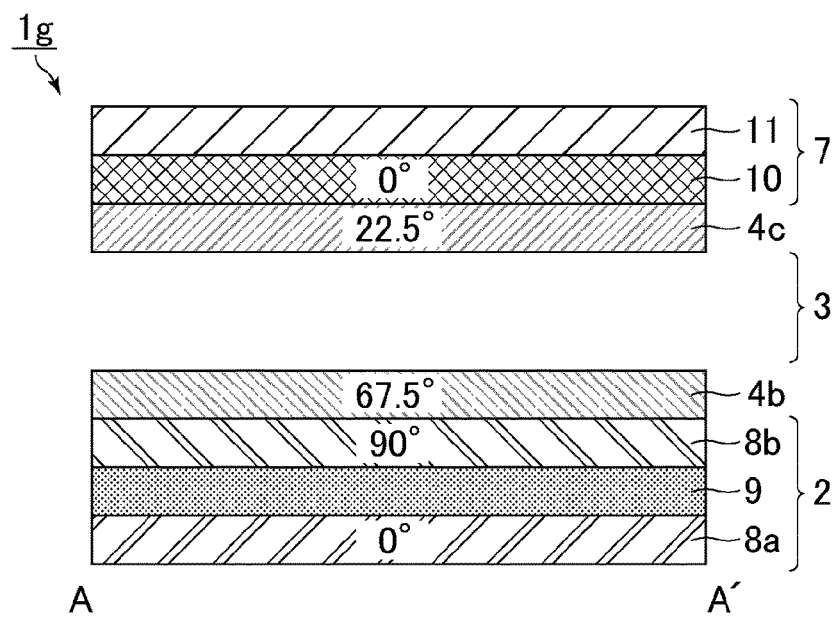
FIG. 8 is a schematic cross-sectional view of a cross section taken along the line A-A' in FIG. 1 (Example 7).

A schematic plan view of a mirror display of Example 7 is the same as in FIG. 1. FIG. 8 is a schematic cross-sectional view of a cross section taken along the line A-A' in FIG. 1 (Example 7). As shown in FIG. 8, a mirror display 1g includes, in the order from the back surface side to the viewing surface side, the liquid crystal display device 2, the λ/2 plate 4b, the air layer 3, the λ/2 plate 4c, and the half mirror plate 7. The λ/2 plate 4b was attached to and integrated with the liquid crystal display device 2 with an acrylic pressure-sensitive adhesive (not shown). The λ/2 plate 4c was attached to and integrated with the half mirror plate 7 with an acrylic pressure-sensitive adhesive (not shown). The integrated member including the liquid crystal display device 2 and the λ/2 plate 4b and the integrated member including the λ/2 plate 4c and the half mirror plate 7 were fixed by fitting the upper and lower edges of the integrated member including the λ/2 plate 4c and the half mirror plate 7 to a pair of aluminum rails which were attached to the upper and lower edges of the integrated member including the liquid crystal display device 2 and the λ/2 plate 4b so as to form a frame-like structure. The air layer 3 is a space formed in a slight gap between the λ/2 plate 4b and the λ/2 plate 4c.

Since the operating principles in the display mode and mirror mode of the mirror display of Example 7 are the same as those of the mirror display of Example 6 except for the positions of the polarization conversion layers (the λ/2 plate 4b and the λ/2 plate 4c), the description thereof is omitted here.

The mirror display of Example 7 includes the reflective polarizer 10 whose length in the direction of the transmission axis is not limited to the width of the original film and whose transmission axis corresponds to the longitudinal direction of the display device, and thus can be enlarged.

Comparative Example 1

Comparative Example 1 relates to a conventional mirror display including a liquid crystal display device and a reflective polarizer as a half mirror layer and including no polarization conversion layer.

Figure 9:
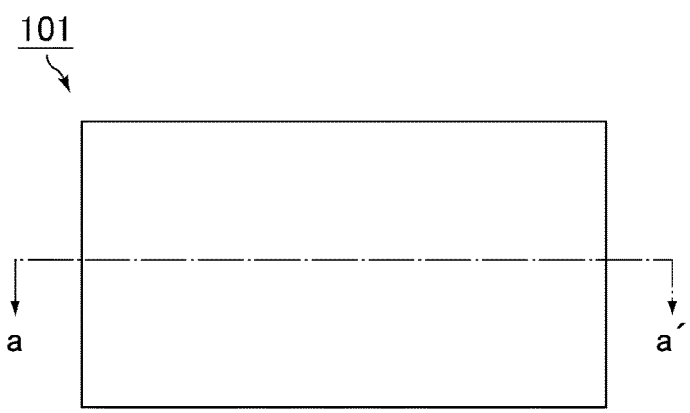
FIG. 9 is a schematic plan view of a mirror display of Comparative Example 1.

FIG. 9 is a schematic plan view of a mirror display of Comparative Example 1. The following describes a case in which a mirror display 101 has a rectangular planar shape as shown in FIG. 9.

Figure 10:
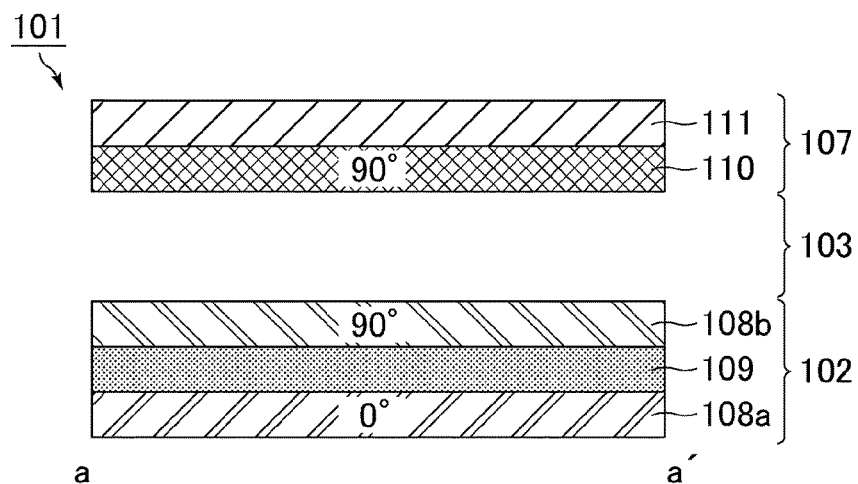
FIG. 10 is a schematic cross-sectional view of a cross section taken along the line a-a' in FIG. 9.

FIG. 10 is a schematic cross-sectional view of a cross section taken along the line a-a' in FIG. 9. As shown in FIG. 10, the mirror display 101 includes, in the order from the back surface side to the viewing surface side, a liquid crystal display device 102, an air layer 103, and a half mirror plate 107. The liquid crystal display device 102 and the half mirror plate 107 were fixed by fitting the upper and lower edges of the half mirror plate 107 to a pair of aluminum rails which were attached to the upper and lower edges of the liquid crystal display device 102 so as to form a frame-like structure. The air layer 103 is a space formed in a slight gap between the liquid crystal display device 102 and the half mirror plate 107.

The liquid crystal display device 102 includes, in the order from the back surface side to the viewing surface side, an absorptive polarizer 108a, a liquid crystal display panel 109, and an absorptive polarizer 108b. The display mode of the liquid crystal display panel 109 was UV2A.

The absorptive polarizer 108a was attached to the back surface side of the liquid crystal display panel 109 with an acrylic pressure-sensitive adhesive (not shown). The absorptive polarizer 108b was attached to the viewing surface side of the liquid crystal display panel 109 with an acrylic pressure-sensitive adhesive (not shown). The absorptive polarizer 108a and the absorptive polarizer 108b were placed in a crossed Nicol state, namely, the transmission axis of the absorptive polarizer 108a was at an azimuth of 0° and the transmission axis of the absorptive polarizer 108b was at an azimuth of 90°, provided that the degree of azimuth is defined to be positive (+) in the counterclockwise direction starting from the longitudinal direction (long side) of the liquid crystal display device 102. The absorptive polarizer 108a and the absorptive polarizer 108b were jointless. The absorptive polarizer 108b underwent no anti-reflection treatment but underwent an anti-glare (AG) treatment with a haze of 3.0% on the surface thereof.

The half mirror plate 107 includes, in the order from the back surface side to the viewing surface side, the reflective polarizer 110 as a half mirror layer and a glass substrate 111 as a base material. The members were attached to each other with an acrylic pressure-sensitive adhesive (not shown). The thickness of the glass substrate 111 was 3 mm. The reflective polarizer 110 used was a multilayer reflective polarizer (trade name: DBEF) available from Sumitomo 3M Ltd. and was placed such that the transmission axis was at an azimuth of 90°. The reflective polarizer 110 was jointless.

The mirror display of Comparative Example 1 can operate both in the display mode and in the mirror mode by the following principles.

In the display mode, the liquid crystal display panel 109 displays an image, and a viewer sees the image on the liquid crystal display panel 109 through the half mirror plate 107. Light emitted from the liquid crystal display device 102 through the absorptive polarizer 108b is linearly polarized light vibrating at an azimuth of 90° and can pass through the reflective polarizer 110 whose transmission axis is at an azimuth of 90° with little loss. The mirror display of Comparative Example 1 can thus provide high luminance display.

In the mirror mode, the liquid crystal display panel 109 displays no image, and a viewer sees only external light reflected by the half mirror plate 107. Among the light components incident on the half mirror plate 107 from the viewing surface side, almost all of the linearly polarized light components vibrating at an azimuth of 0° are reflected by the reflective polarizer 110 whose transmission axis is at an azimuth of 90°, namely, whose reflection axis is at an azimuth of 0°.

In contrast, among the light components incident on the half mirror plate 107 from the viewing surface side, linearly polarized light components vibrating at an azimuth of 90° pass through the reflective polarizer 110 whose transmission axis is at an azimuth of 90°. The light components passed through the reflective polarizer 110 then pass through the absorptive polarizer 108b whose transmission axis is at an azimuth of 90° and the liquid crystal display panel 109 in the stated order, and are finally absorbed by the absorptive polarizer 108a whose transmission axis is at an azimuth of 0°, namely, whose absorption axis is at an azimuth of 90°.

Unfortunately, the mirror display of Comparative Example 1 includes the reflective polarizer 110 whose length in the direction of the reflection axis is limited to the width of the original film and whose reflection axis corresponds to the longitudinal direction of the display device, and thus cannot be enlarged. In addition, in the mirror display of Comparative Example 1, the roll-to-roll attachment process cannot be employed for attachment of the absorptive polarizer 108b and the reflective polarizer 110 if necessary because the machine directions of the original films of the respective polarizers are perpendicular to each other. Thus, a single wafer attachment process is employed which raises the production cost.

[Operation Confirmation Result of Mirror Display]

The mirror displays of Examples 1 to 7 were confirmed that they operated both in the display mode and mirror mode similarly to the mirror display of Comparative Example 1.

[Feasible Size of Mirror Display]

Table 1 shows the simulation results of feasible sizes of the mirror displays of Examples 1 to 7 and Comparative Example 1. The simulation was performed as follows and the results of Cases 1 to 5 in Table 1 were evaluated. The aspect ratio of the display region of each liquid crystal display device was assumed to be 16:9. The width of the original film of the absorptive polarizer (absorptive polarizer 8b or absorptive polarizer 108b) on the half mirror plate side (viewing surface side) was defined as W1 (mm). The width of the original film of the reflective polarizer (reflective polarizer 10 or reflective polarizer 110) as a half mirror layer was defined as W2 (mm). The maximum feasible size D (diagonal length in inches) of the mirror display was calculated on the basis of the above definitions. The maximum feasible size D of a mirror display was calculated as follows. First, the maximum sizes (diagonal lengths in inches) for cutting out a sheet having an aspect ratio of 16:9 from the original film of the absorptive polarizer and from the original film of the reflective polarizer were each calculated. The calculated sizes were then compared and the smaller size was taken as the maximum feasible size D of the mirror display. For example, in Case 2 (W1=1280 mm, W2=1000 mm) of Examples 1 to 7 in Table 1, the maximum size of the absorptive polarizer 8b is calculated to be 103 inches, and the maximum size of the reflective polarizer 10 is calculated to be 80 inches. Accordingly, the maximum feasible size D of the mirror display is determined as 80 inches. In Case 2 of Comparative Example 1, the maximum size of the absorptive polarizer 108b is calculated to be 103 inches which is the same as in Examples 1 to 7 while the maximum size of the reflective polarizer 110 is calculated to be 45 inches. Accordingly, the maximum feasible size D of the mirror display is determined as 45 inches. For simple simulation, the polarization conversion layer used in Examples 1 to 7 was assumed to be producible at any size. Similarly, the absorptive polarizer (absorptive polarizer 8a or absorptive polarizer 108a) placed on the opposite side (back surface side) of the half mirror plate was assumed to be producible at any size. This assumption works because the width of the original film of the absorptive polarizer is larger than the width of the original film of the reflective polarizer in conventional production processes, and thus an absorptive polarizer can be made larger than the reflective polarizer.

TABLE 1

| | W1 (mm) | W2 (mm) | D (inch) Examples 1 to 7 | D (inch) Comparative Example 1 |
|---|---|---|---|---|
| Case 1 | 1000 | 1000 | 80 | 45 |
| Case 2 | 1280 | 1000 | 80 | 45 |
| Case 3 | 1280 | 1280 | 103 | 58 |
| Case 4 | 1440 | 1280 | 103 | 58 |
| Case 5 | 1440 | 1440 | 116 | 65 |

As shown in Table 1, comparison under the same conditions indicates that the mirror displays of Examples 1 to 7 each could be made larger than the mirror display of Comparative Example 1. In Cases 1 to 5 of the mirror displays of Examples 1 to 7, the sizes of the reflective polarizers 10 each were 80 inches or larger. In contrast, in Cases 1 to 5 of the mirror display of Comparative Example 1, the sizes of the reflective polarizer 110 were each 65 inches or smaller. This indicates that a larger reflective polarizer can be produced when the reflective polarizer is cut out such that the machine direction (transmission axis direction) of the original film corresponds to the longitudinal direction of the reflective polarizer, as described for the reflective polarizers 10 used for the mirror displays of Examples 1 to 7.

As described above, the polarization conversion layers used in Examples 1 to 7 were each assumed to be producible at any size for simple simulation. Even if it is impossible to obtain a desired size of a polarization conversion layer and a polarization conversion layer consisting of some parts jointed is used, the effects of the present invention still can be achieved. This is because the polarization conversion layer is placed on the back surface side of the reflective polarizer so that the joints of the polarization conversion layer are less likely to be perceived. A preferred polarization conversion layer is jointless and has a size and shape (e.g. a roll) that allows for attachment to a polarizer (absorptive polarizer or reflective polarizer) by the roll-to-roll attachment process.

In the mirror displays of Examples 1 to 7, the polarization conversion layer is used with the absorptive polarizer 8b and the reflective polarizer 10 to constitute a pseudo parallel Nicol state. The inventors studied and found that such a pseudo parallel Nicol state provides favorable viewing angle characteristics unlike the case of a pseudo crossed Nicol state as disclosed in Patent Literature 1. The reason for this is described below by giving an example.

Figure 11:
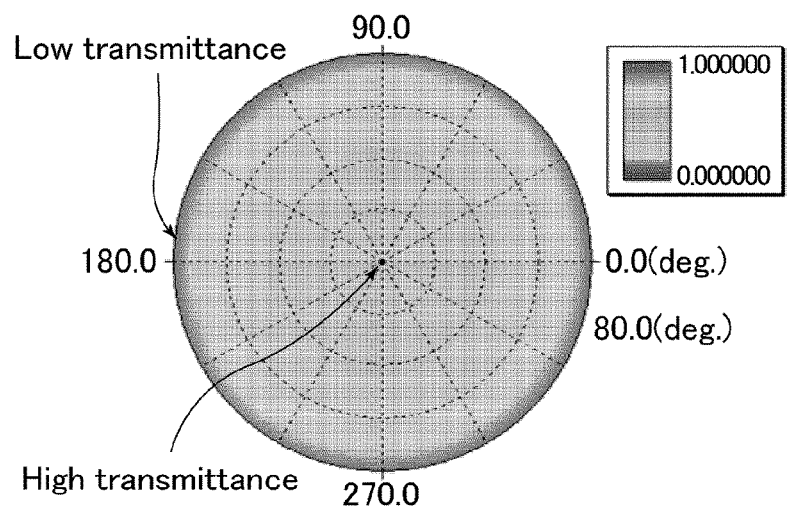
FIG. 11 is a contour plot showing the simulation result of the viewing angle characteristics of the transmittance in the mirror display of Example 1.
Figure 12:
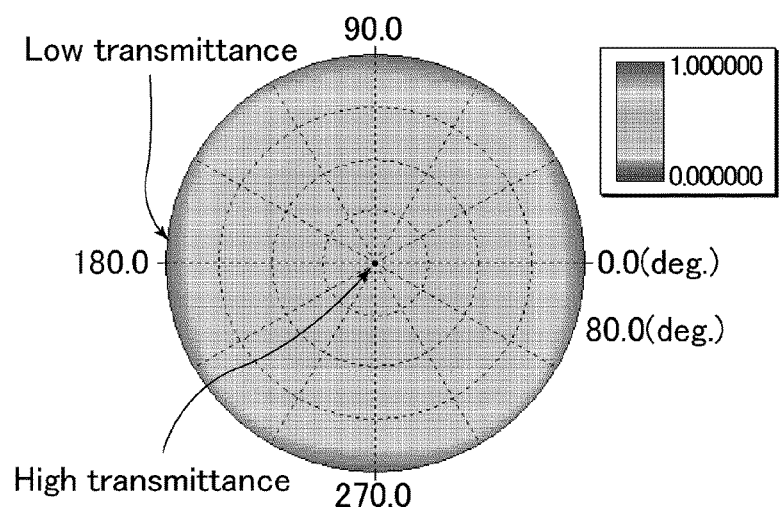
FIG. 12 is a contour plot showing the simulation result of the viewing angle characteristics of the transmittance in each of the mirror displays of Examples 6 and 7.
Figure 13:
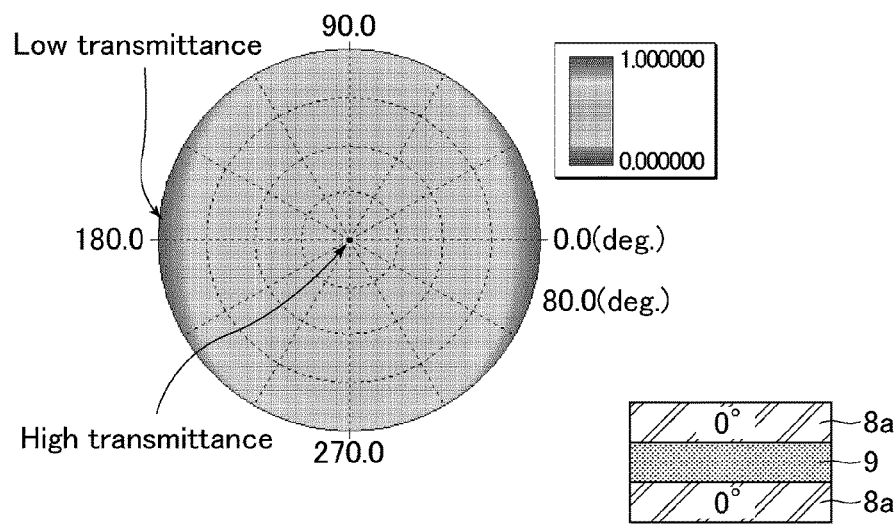
FIG. 13 includes a contour plot showing the simulation result of the viewing angle characteristics of the transmittance in an actual parallel Nicol state.
Figure 14:
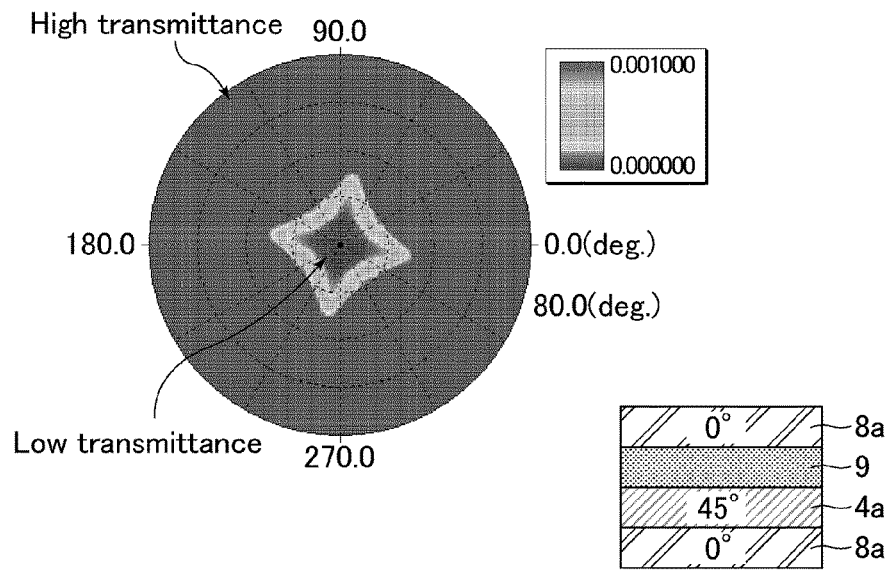
FIG. 14 includes a contour plot showing the simulation result of the viewing angle characteristics of the transmittance in a pseudo crossed Nicol state.
Figure 15:
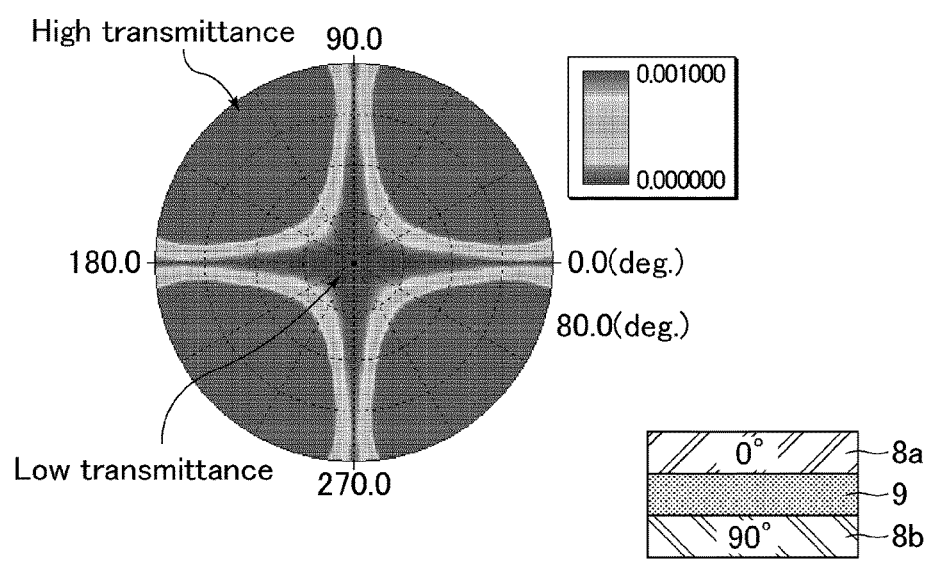
FIG. 15 includes a contour plot showing the simulation result of the viewing angle characteristics of the transmittance in an actual crossed Nicol state.

FIG. 11 is a contour plot showing the simulation result of the viewing angle characteristics of the transmittance in the mirror display of Example 1. FIG. 12 is a contour plot showing the simulation result of the viewing angle characteristics of the transmittance in each of the mirror displays of Examples 6 and 7. FIG. 13 includes a contour plot showing the simulation result of the viewing angle characteristics of the transmittance in an actual parallel Nicol state. The right figure in FIG. 13 shows an actual parallel Nicol state in which, in the order from the back surface side to the viewing surface side, the absorptive polarizer 8a (azimuth of the transmission axis: 0°), the liquid crystal display panel 9, and the absorptive polarizer 8a (azimuth of the transmission axis: 0°) are stacked. The members were attached together with an acrylic pressure-sensitive adhesive (not shown). FIG. 14 includes a contour plot showing the simulation result of the viewing angle characteristics of the transmittance in a pseudo crossed Nicol state. The right figure in FIG. 14 shows a pseudo crossed Nicol state in which, in the order from the back surface side to the viewing surface side, the absorptive polarizer 8a (azimuth of the transmission axis: 0°), the λ/2 plate 4a (azimuth of the slow axis: 45°), the liquid crystal display panel 9, and the absorptive polarizer 8a (azimuth of the transmission axis: 0°) are stacked, which is the same configuration as that disclosed in Patent Literature 1. The members were attached together with an acrylic pressure-sensitive adhesive (not shown). FIG. 15 includes a contour plot showing the simulation result of the viewing angle characteristics of the transmittance in an actual crossed Nicol state. The right figure in FIG. 15 shows an actual crossed Nicol state in which, in the order from the back surface side to the viewing surface side, the absorptive polarizer 8b (azimuth of the transmission axis: 90°), the liquid crystal display panel 9, and the absorptive polarizer 8a (azimuth of the transmission axis: 0°) are stacked. The members were attached together with an acrylic pressure-sensitive adhesive (not shown). The simulation results illustrated in FIGS. 11 to 15 each show the viewing angle characteristics of the transmittance (relation between the azimuth angle, polar angle, and transmittance) under irradiation with a backlight unit that is assumed to be a Lambertian backlight unit from the back surface side. In each of the simulation results of FIGS. 11 to 15, the center of the circle indicates the calculation result at a polar angle of 0°, and a point on the outermost circumference indicates the calculation result at a polar angle of 80°. The transmittance in FIG. 11 was assumed to be observed from the viewing surface side of the mirror display of Example 1 (viewing surface side of the half mirror plate 7). The transmittance in FIG. 12 was assumed to be observed from the viewing surface side of each of the mirror displays of Examples 6 and 7 (viewing surface side of the half mirror plate 7). The transmittance in FIG. 13 was assumed to be observed from the side of the viewing-surface-side absorptive polarizer 8a opposite to the liquid crystal display panel 9. The transmittance in FIG. 14 was assumed to be observed from the side of the viewing-surface-side absorptive polarizer 8a opposite to the liquid crystal display panel 9. The transmittance in FIG. 15 was assumed to be observed from the side of the absorptive polarizer 8a opposite to the liquid crystal display panel 9. The simulation was performed using a liquid crystal optical simulator (trade name: LCD Master) available from Shintec Co., Ltd.

As shown in FIGS. 11 to 13, comparison between the pseudo parallel Nicol state and the actual parallel Nicol state indicated that these states both succeeded in uniformly achieving high transmittance in a wide viewing angle range and had similar viewing angle characteristics. In contrast, as shown in FIG. 14 and FIG. 15, comparison between the pseudo crossed Nicol state and the actual crossed Nicol state indicated that the pseudo crossed Nicol state had a smaller viewing angle range that achieves low transmittance and thus failed in achieving similar viewing angle characteristics to those in the actual crossed Nicol state. In conclusion, the pseudo parallel Nicol state can achieve good viewing angle characteristics unlike the pseudo crossed Nicol state. This finding is applicable to other pseudo parallel Nicol states such as those in the mirror displays of Examples 2 to 5.

[Additional Remarks]

The following are preferred embodiments of the mirror display of the present invention. The respective examples may appropriately be combined with each other within the spirit of the present invention.

The polarization conversion layer may be configured to rotate the azimuth of polarized light passed through the absorptive polarizer by 90°. This configuration can achieve high luminance display in the display mode by fully using polarized light passed through the absorptive polarizer and provide a pseudo parallel Nicol state.

The polarization conversion layer may include a retarder. This configuration enables effective use of the polarization conversion layer by the effect that the retarder causes a phase difference between polarized light components passed through the absorptive polarizer. The retarder may include a λ/2 plate. The retarder may include a λ/4 plate.

The polarization conversion layer may include a polarization rotator. This configuration enables effective use of the polarization conversion layer by the effect that the polarization rotator rotates the polarization of polarized light passed through the absorptive polarizer.

The polarization conversion layer may be integrated with the half mirror plate. This configuration can reduce production cost because the polarization conversion layer and the half mirror plate (the reflective polarizer) can be attached together by the roll-to-roll attachment process.

The polarization conversion layer may be integrated with the display device. This configuration can reduce production cost because the polarization conversion layer and the display device (the absorptive polarizer) can be attached together by the roll-to-roll attachment process.

The polarization conversion layer may be jointless. This configuration can perfectly eliminate the possibility of the joints of the polarization conversion layer being perceived.

The display device may be a liquid crystal display device. This configuration enables suitable use of the present invention in the case of using a liquid crystal display device as a display device. Furthermore, combination use with the reflective polarizer achieves both of the visibility of the images in the display mode and the visibility of the mirror in the mirror mode. Any types of display devices that emit polarized light may be used, and examples thereof include a 3D compatible display which provides three-dimensional (3D) video images, in addition to a liquid crystal display device. A 3D compatible display can provide natural sense of depth in the display region as well as the mirror region, which enhances the design of the mirror display and enables use of the mirror display in various applications. Any display style for providing three-dimensional video images may be employed for the 3D compatible display, and preferred is a naked-eye display style which does not require glasses. Examples of the naked-eye 3D compatible display include a display with a lenticular lens and a display with a parallax barrier.

REFERENCE SIGNS LIST 1a, 1b, 1c, 1d, 1e, 1f, 1g, 101: mirror display
2, 102: liquid crystal display device
3, 103: air layer
4a, 4b, 4c: λ/2 plate
5a, 5b: λ/4 plate
6: polarization rotator
7, 107: half mirror plate
8a, 8b, 108a, 108b: absorptive polarizer
9, 109: liquid crystal display panel
10, 110: reflective polarizer
11, 111: glass substrate

The invention claimed is:

1. A mirror display comprising:
in order from a viewing surface side:
a half mirror plate including a reflective polarizer;
a polarization conversion layer; and
a display device including an absorptive polarizer and a display panel, wherein the absorptive polarizer is closer to the polarization conversion layer than the display panel, the reflective polarizer has a transmission axis parallel to the longitudinal direction of the display device and is jointless, the absorptive polarizer has a transmission axis perpendicular to the longitudinal direction of the display device and is jointless, and the polarization conversion layer converts polarization of polarized light passed through the absorptive polarizer.

2. The mirror display according to claim 1, wherein the polarization conversion layer rotates an azimuth of polarized light passed through the absorptive polarizer by 90°.

3. The mirror display according to claim 1, wherein the polarization conversion layer includes a retarder.

4. The mirror display according to claim 3, wherein the retarder includes a λ/2 plate.

5. The mirror display according to claim 3, wherein the retarder includes a λ/4 plate.

6. The mirror display according to claim 1, wherein the polarization conversion layer includes a polarization rotator.

7. The mirror display according to claim 1, wherein the polarization conversion layer is integrated with the half mirror plate.

8. The mirror display according to claim 1, wherein the polarization conversion layer is integrated with the display device.

9. The mirror display according to claim 1, wherein the polarization conversion layer is jointless.

10. The mirror display according to claim 1, wherein the display device is a liquid crystal display device.

* * * * *